(12) United States Patent
Burra et al.

(10) Patent No.: US 9,554,413 B2
(45) Date of Patent: Jan. 24, 2017

(54) CASE-BASED RADIO PLATFORM FOR WIRELESS NETWORK

(71) Applicant: QUALCOMM Incorporated, San Diego, CA (US)

(72) Inventors: Gangadhar Burra, Fremont, CA (US);
MeeLan Lee, Los Altos, CA (US);
Gireesh Rajendran, Karnataka (IN);
Anup Savla, Santa Clara, CA (US);
Jeremy Lin, San Diego, CA (US);
Soumya Das, San Diego, CA (US);
Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/615,348

(22) Filed: Feb. 5, 2015

(65) Prior Publication Data

US 2016/0234876 A1 Aug. 11, 2016

(51) Int. Cl.
*H04W 76/02* (2009.01)
*H04B 1/403* (2015.01)
*H04W 36/14* (2009.01)
*H04W 28/02* (2009.01)
*H04W 36/00* (2009.01)
(Continued)

(52) U.S. Cl.
CPC ........... *H04W 76/026* (2013.01); *H04B 1/406* (2013.01); *H04W 28/0284* (2013.01); *H04W 36/0066* (2013.01); *H04W 36/14* (2013.01); *H04W 36/30* (2013.01); *H04W 88/06* (2013.01)

(58) Field of Classification Search
CPC ...... H04W 28/02; H04W 28/12; H04W 48/06; H04W 48/18; H04W 76/062
See application file for complete search history.

(56) References Cited

U.S. PATENT DOCUMENTS

2006/0217112 A1* 9/2006 Mo ................... H04W 36/14
455/422.1
2007/0129045 A1 6/2007 Aerrabotu
(Continued)

FOREIGN PATENT DOCUMENTS

EP 2717480 A1 4/2014
EP 2757826 A1 7/2014

OTHER PUBLICATIONS

International Search Report and Written Opinion—PCT/US2015/065078—ISA/EPO—Mar. 11, 2016.

*Primary Examiner* — Curtis Odom
(74) *Attorney, Agent, or Firm* — Arent Fox LLP

(57) ABSTRACT

One aspect of an apparatus for wireless communications is disclosed. The apparatus includes a controller, a first transceiver, and a second transceiver. The first transceiver is configurable by the controller to support first communications through a cellular network to at least one of a packet-based network and a circuit-switched network. The second transceiver configurable by the controller to operate with the first transceiver to support first communications through the cellular network in a first mode and support second communications through an access point to the packet-based network in a second mode. In an aspect, the second transceiver is further configured to switch from the first mode to the second mode by moving its wireless connection from the cellular network to the access point while maintaining a network-layer connection to the cellular network.

34 Claims, 11 Drawing Sheets

(51) Int. Cl.
*H04W 36/30* (2009.01)
*H04W 88/06* (2009.01)

(56) References Cited

U.S. PATENT DOCUMENTS

| | | |
|---|---|---|
| 2013/0072135 A1* | 3/2013 | Banerjea ................ H04B 1/525 |
| | | 455/83 |
| 2013/0217398 A1 | 8/2013 | Winiecki et al. |
| 2013/0303168 A1 | 11/2013 | Aminzadeh Gohari et al. |
| 2014/0029434 A1 | 1/2014 | Wang et al. |
| 2014/0043979 A1 | 2/2014 | Etemad et al. |
| 2014/0153489 A1 | 6/2014 | Perras et al. |
| 2014/0187240 A1* | 7/2014 | Chen ....................... H04W 4/14 |
| | | 455/426.1 |
| 2014/0204745 A1* | 7/2014 | Nuss ..................... H04W 28/08 |
| | | 370/232 |
| 2015/0173009 A1* | 6/2015 | Vallath .................. H04W 48/20 |
| | | 370/329 |

\* cited by examiner

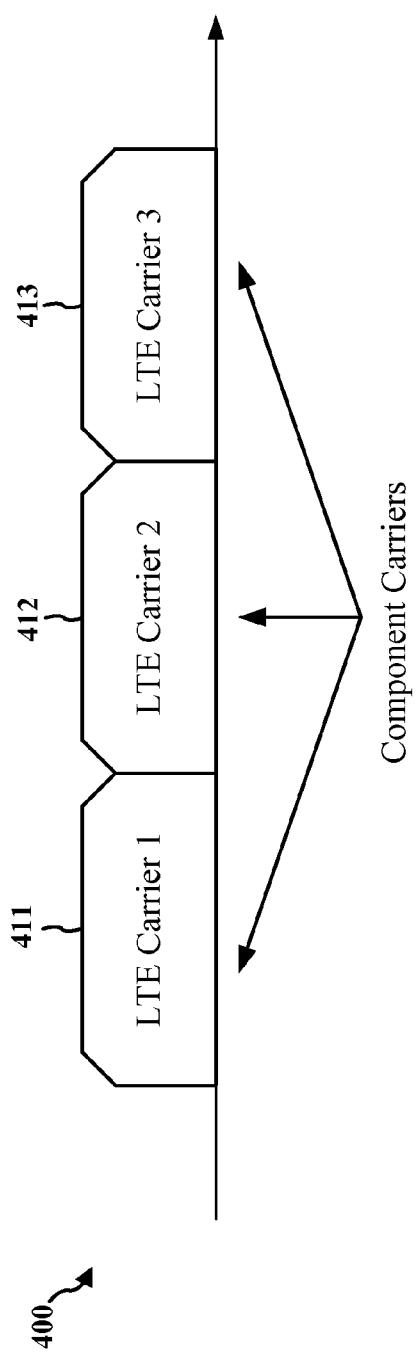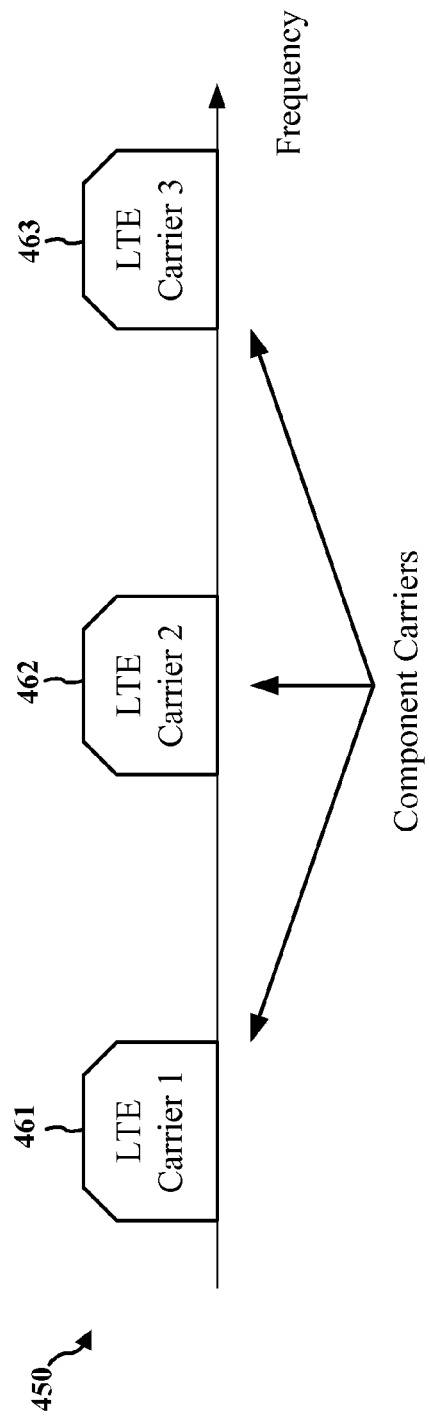

| UL/DL CFG | DL→UL Switch Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

CASE-BASED RADIO PLATFORM FOR WIRELESS NETWORK

FIELD

The present disclosure relates generally to telecommunications, and specifically to communications channels in a wireless device.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology.

Existing wireless devices use multiple antennas, modems, and processors to enable the device to communicate with other devices using multiple communications protocols. Some of these protocols can be used simultaneously, such as using one protocol to enable voice communications over a wide-area network (WAN), while using a different protocol to enable data communications over a local-area network (LAN). However, use of such antennas, modems, and processors usually involves adding redundant components to the device to enable use through the different communications protocols, which take up valuable area within the device and consume unnecessary power.

Based on these issues, there exists a need for improvement of wireless devices to handle multiple communications protocols efficiently. Preferably, a solution would efficiently use components within the device and save physical area occupied to enable such communications.

SUMMARY

One aspect of an apparatus for wireless communications is disclosed. The apparatus includes a controller, a first transceiver, and a second transceiver. The first transceiver is configurable by the controller to support first communications through a cellular network to at least one of a packet-based network and a circuit-switched network. The second transceiver configurable by the controller to operate with the first transceiver to support first communications through the cellular network in a first mode and support second communications through an access point to the packet-based network in a second mode. In an aspect, the second transceiver is further configured to switch from the first mode to the second mode by moving its wireless connection from the cellular network to the access point while maintaining a network-layer connection to the cellular network.

One aspect of method of wireless communications is disclosed. The method includes a first transceiver configurable by a controller supporting first communications through a cellular network to at least one of a packet-based network and a circuit-switched network. The method also includes a second transceiver configurable by a controller supporting first communications through the cellular network in a first mode with the first transceiver and supporting second communications through an access point to the packet-based network in a second mode. In an aspect, the method also includes the second transceiver switching from the first mode to the second mode. This method includes moving its wireless connection from the cellular network to the access point and maintaining a network-layer connection to the cellular network.

One aspect of an apparatus for wireless communications is disclosed. The apparatus includes a transceiver for supporting first communications through a cellular network to at least one of a packet-based network and a circuit-switched network. The apparatus also includes means for operating with the transceiver to support first communications through the cellular network in a first mode and supporting second communications through an access point to the packet-based network in a second mode. In an aspect, the means is configured to switch from the first mode to the second mode. This comprises of the means moving a wireless connection from the cellular network to the access point, and maintaining a network-layer connection to the cellular network.

One aspect of a computer program product for wireless communications is disclosed. The computer program product includes a non-transitory computer-readable medium comprising code. The code is executable by one or more processors for a first configurable transceiver supporting first communications through a cellular network to at least one of a packet-based network and a circuit-switched network. The code is executable by one or more processors for a second configurable transceiver supporting, with the first configurable transceiver, first communications through the cellular network in a first mode and supporting second communications through an access point to the packet-based network in a second mode. In an aspect, the computer program product also includes cod executable by one or more processors for the second configurable transceiver switching from the first mode to the second mode. This code includes code for moving its wireless connection from the cellular network to the access point and code for maintaining a network-layer connection to the cellular network.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of apparatuses and methods will now be presented in the detailed description by way of example, and not by way of limitation, with reference to the accompanying drawings, wherein:

FIG. 4A is diagram illustrating an exemplary embodiment of a continuous carrier aggregation (CA) type communications channel;

FIG. 4B is a diagram illustrating an exemplary embodiment of a non-continuous CA-type communications channel;

FIG. 7 is a table illustrating exemplary configurations of frame allocations for a wireless communications channel;

DETAILED DESCRIPTION

Figure 1:
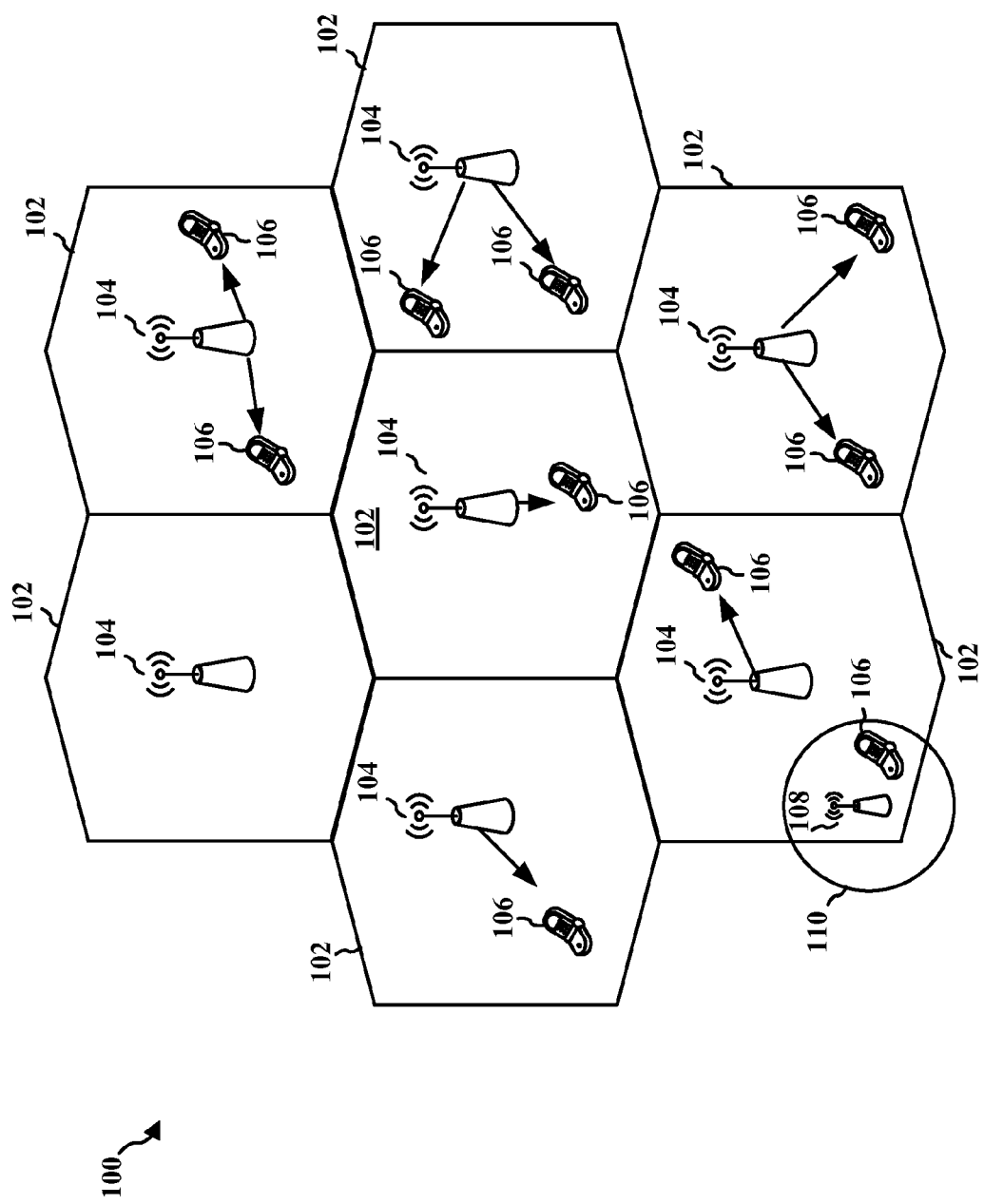
FIG. 1 is a conceptual diagram illustrating an exemplary embodiment of an access network.

Various concepts will be described more fully hereinafter with reference to the accompanying drawings. These concepts may, however, be embodied in many different forms by those skilled in the art and should not be construed as limited to any specific structure or function presented herein. Rather, these concepts are provided so that this disclosure will be thorough and complete, and will fully convey the scope of these concepts to those skilled in the art. The detailed description may include specific details. However, it will be apparent to those skilled in the art that these concepts may be practiced without these specific details. In some instances, well known structures and components are shown in block diagram form in order to avoid obscuring the various concepts presented throughout this disclosure.

The word "exemplary" is used herein to mean serving as an example, instance, or illustration. Any embodiment described herein as "exemplary" or "illustrative" is not necessarily to be construed as preferred or advantageous over other embodiments. Likewise, the term "embodiment" of an apparatus or method does not require that all embodiments of the invention include the described components, structure, features, functionality, processes, advantages, benefits, or modes of operation.

These concepts will now be presented with reference to various apparatus and methods. These apparatus and methods will be described in the following detailed description and illustrated in the accompanying drawings by various elements comprising blocks, modules, components, circuits, steps, processes, algorithms, and the like. These elements, or any portion thereof, either alone or in combinations with other elements and/or functions, may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "controller" that includes one or more processors. A processor may include a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

One or more processors in the controller may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on transitory or non-transitory computer-readable medium. A non-transitory computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), static RAM (SRAM), dynamic RAM (DRAM), synchronous dynamic RAM (SDRAM); double date rate RAM (DDRAM), read only memory (ROM), programmable ROM (PROM), erasable PROM (EPROM), electrically erasable PROM (EEPROM), a general register, or any other suitable non-transitory medium for storing software.

The various interconnections within a controller may be shown as buses or as single signal lines. Each of the buses may alternatively be a single signal line, and each of the single signal lines may alternatively be buses, and a single line or bus might represent any one or more of a myriad of physical or logical mechanisms for communication between elements. Any of the signals provided over various buses described herein may be time-multiplexed with other signals and provided over one or more common buses.

FIG. 1 is a conceptual diagram illustrating an exemplary embodiment of an access network 100 in an LTE network architecture. In illustrative embodiment, access network 100 is divided into a number of cellular regions (cells) 102. One or more lower-power class eNBs 108 can have cellular regions 110 that overlap with one or more of cells 102. Lower-power class eNB 108 may be a femto cell (e.g., home eNB or HeNB), pico cell, micro cell, or remote radio head (RRH). Macro eNBs 104 are each assigned to a respective cell 102 and are configured to provide an access point to an evolved packet core (EPC) for all wireless devices 106 in cells 102. There is no centralized controller in this example of an access network 100, but a centralized controller may be used in alternative configurations. The eNBs 104 are responsible for all radio-related functions including radio bearer control, admission control, mobility control, scheduling, security, and connectivity to a serving gateway. An eNB can support one or multiple (e.g., three) cells (also referred to as a sector). The term "cell" can refer to the smallest coverage area of an eNB and/or an eNB subsystem serving are particular coverage area. Further, the terms "eNB," "base station," and "cell" can be used interchangeably herein.

The modulation and multiple access scheme employed by access network 100 can vary, depending on the particular telecommunications standard being deployed. In LTE applications, orthogonal frequency-division multiplexing (OFDM) is used on the DL and SC-FDMA is used on the UL to support both frequency-division duplex (FDD) and time-division duplex (TDD). As those skilled in the art will readily appreciate from the detailed description to follow, the various concepts presented herein are well-suited for LTE applications. However, these concepts may be readily extended to other telecommunication standards employing other modulation and multiple access techniques.

By way of example, these concepts may be extended to Evolution-Data Optimized (EV-DO) or Ultra-Mobile Broadband (UMB). EV-DO and UMB are air interface standards promulgated by the 3rd-Generation Partnership Project 2 (3GPP2) as part of the CDMA2000 family of standards and employs CDMA to provide broadband Internet access to mobile stations. These concepts can also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 502.11 (Wi-Fi), IEEE 502.16 (WiMAX), IEEE 502.20, and Flash-OFDM employing OFDMA. UTRA, E-UTRA, UMTS, LTE, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 104 can have multiple antennas supporting MIMO technology. The use of MIMO technology enables eNBs 104 to exploit the spatial domain to support spatial multiplexing, beamforming, and transmit diversity. Spatial multiplexing can be used to transmit different streams of data simultaneously on the same frequency. The data streams can be transmitted to a single wireless device 106 to increase the data rate or to multiple wireless devices 106 to increase the overall system capacity. This is achieved by spatially precoding each data stream (i.e., applying a scaling of an amplitude and a phase) and then transmitting each spatially-precoded stream through multiple transmit antennas on the DL. The spatially-precoded data streams arrive at wireless device(s) 206 with different spatial signatures, which enables each of wireless device(s) 206 to recover the one or more data streams destined for that UE 206. On the UL, each wireless device 206 transmits a spatially-precoded data stream, which enables eNB 204 to identify the source of each spatially-precoded data stream.

Spatial multiplexing is generally used when channel conditions are good. When channel conditions are less favorable, beamforming may be used to focus the transmission energy in one or more directions. This can be achieved by spatially precoding the data for transmission through multiple antennas. To achieve good coverage at the edges of the cell, a single stream beamforming transmission can be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) can be added to each OFDM symbol to combat inter-OFDM-symbol interference. The UL can use SC-FDMA in the form of a DFT-spread OFDM signal to compensate for high peak-to-average power ratio (PAPR).

Figure 2:
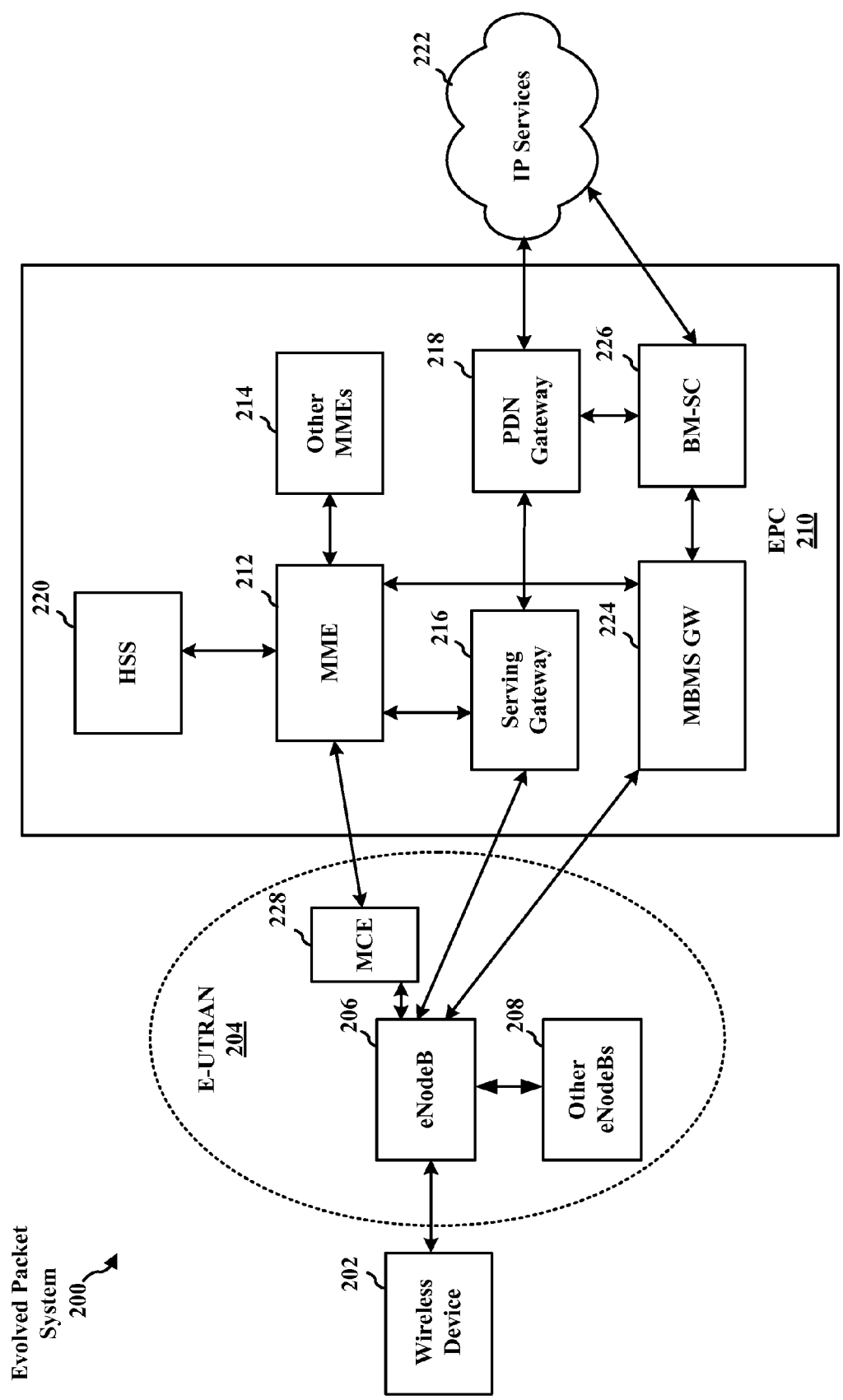
FIG. 2 is a conceptual diagram illustrating an exemplary embodiment of a network architecture.

FIG. 2 is a conceptual diagram illustrating an exemplary embodiment of a network architecture 200. LTE network architecture 200 can be referred to as an Evolved Packet System (EPS) 200. EPS 200 can include one or more wireless devices 202, an Evolved UMTS Terrestrial Radio Access Network (E-UTRAN) 204, an Evolved Packet Core (EPC) 210, and an Operator's Internet Protocol (IP) Services 222. EPS 200 can interconnect with other access networks, but for simplicity those entities/interfaces are not shown. As shown, EPS 200 provides packet-switched services; however, as those skilled in the art will readily appreciate, the various concepts presented throughout this disclosure may be extended to networks providing circuit-switched services.

E-UTRAN 204 can include eNB 206 and other eNBs 208, and can include a Multicast Coordination Entity (MCE) 228. The eNB 206 provides user and control planes protocol terminations toward the wireless device 202. The eNB 206 can be connected to the other eNBs 108 via a backhaul (e.g., an X2 interface). MCE 228 allocates time/frequency radio resources for evolved Multimedia Broadcast Multicast Service [MBMS] (eMBMS), and determines the radio configuration (e.g., a modulation-and-coding scheme [MCS]) for the eMBMS. MCE 228 can be a separate entity or part of eNB 206. The eNB 206 can also be referred to as: a base station, a Node B, an access point, a base transceiver station, a radio base station, a radio transceiver, a transceiver function, a basic service set (BSS), an extended service set (ESS), or some other suitable terminology.

The eNB 206 can provide an access point to EPC 210 for a wireless device 202 (e.g., user equipment (UE)). Examples of wireless devices 202 include: a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. wireless device 202 may also be referred to by those skilled in the art as: a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected to EPC 210. EPC 210 can include a Mobility Management Entity (MME) 212, a Home Subscriber Server (HSS) 220, other MMEs 214, a Serving Gateway 216, a Multimedia Broadcast Multicast Service (MBMS) Gateway 224, a Broadcast Multicast Service Center (BM-SC) 226, and a Packet Data Network (PDN) Gateway 218.

MME 212 can be the control node that processes the signaling between the wireless device 202 and EPC 210. Generally, MME 212 provides bearer and connection management. All user IP packets are transferred through Serving Gateway 216, which itself is connected to PDN Gateway 218. PDN Gateway 218 provides wireless device-IP address allocation, as well as other functions. PDN Gateway 218 and BM-SC 226 are connected to IP Services 222. IP Services 222 can include the Internet, an intranet, an IP Multimedia Subsystem (IMS), a PS Streaming Service (PSS), and/or other IP services. BM-SC 226 can provide functions for MBMS user-service provisioning and delivery. BM-SC 226 can serve as an entry point for content provider MBMS transmission, can be used to authorize and initiate MBMS Bearer Services within a PLMN, and can be used to schedule and deliver MBMS transmissions. MBMS Gateway 224 can be used to distribute MBMS traffic to the eNBs (e.g., 106, 108) belonging to a Multicast Broadcast Single Frequency Network (MBSFN) area broadcasting a particular service, and can be responsible for session management (start/stop) and for collecting eMBMS-related charging information.

Figure 3:
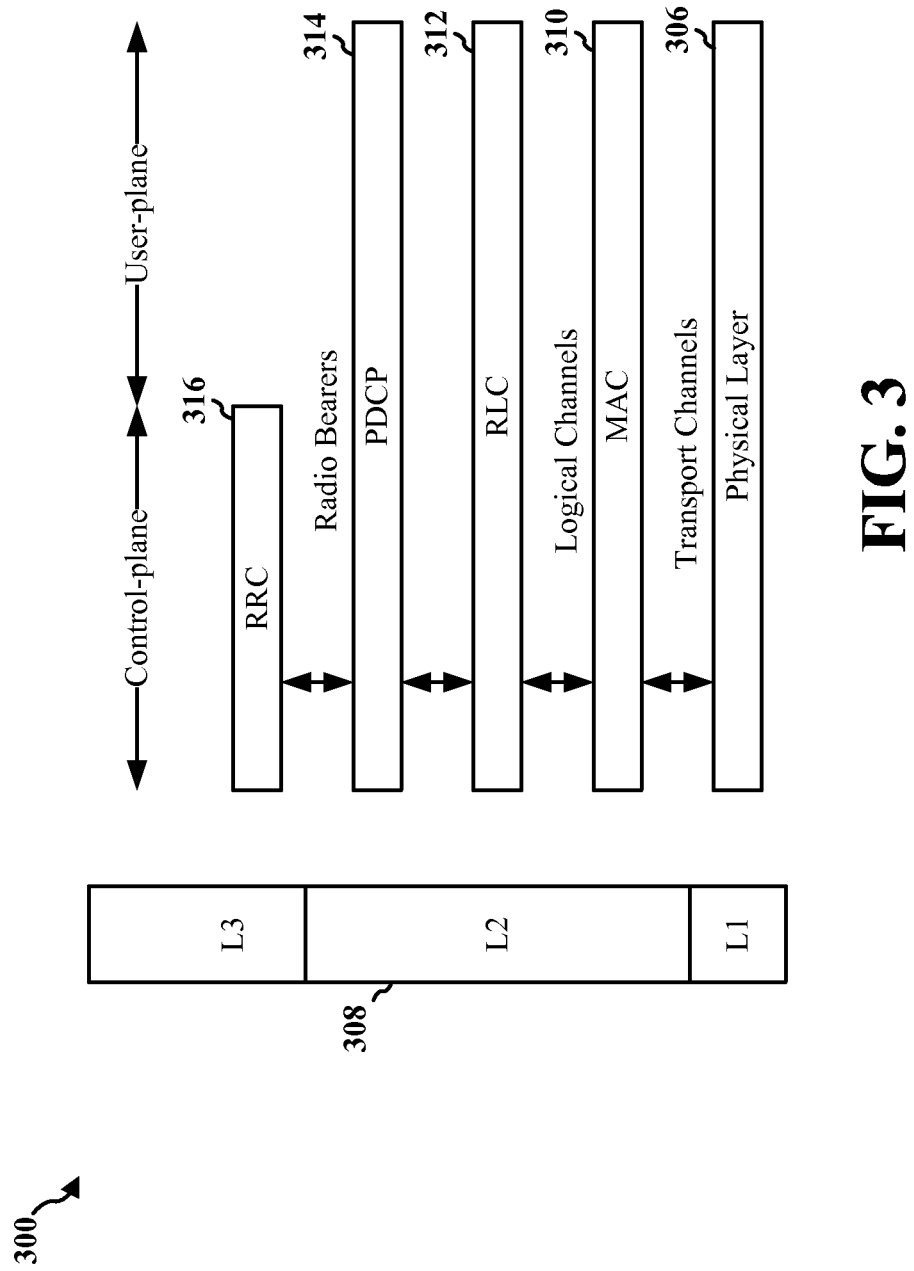
FIG. 3 is a conceptual diagram illustrating an exemplary embodiment of a radio protocol architecture for the user and control planes.

FIG. 3 is a conceptual diagram illustrating an exemplary embodiment of a radio protocol architecture for the user and control planes. The radio protocol architecture for the wireless device and the eNB is shown with three layers: Layer 1, Layer 2, and Layer 3. Layer 1 (L1 layer) is the lowest layer and implements various physical-layer signal processing functions. The L1 layer will be referred to herein as physical layer 306. Layer 2 (L2 layer) 308 is above physical layer 306 and is responsible for the link between the wireless device and eNB over physical layer 306.

In the user plane, L2 layer 308 includes a media access control (MAC) sublayer 310, a radio link control (RLC) sublayer 312, and a packet data convergence protocol (PDCP) 314 sublayer, which are terminated at the eNB on the network side. Although not shown, the wireless device can have several upper layers above the L2 layer 308, including a network layer (e.g., IP layer) that is terminated at the PDN gateway 218 on the network side, and an application layer that is terminated at the other end of the connection (e.g., far-end wireless device, server, etc.).

PDCP sublayer 314 can provide multiplexing between different radio bearers and logical channels. PDCP sublayer 314 can also provide header compression for upper-layer data packets to reduce radio-transmission overhead, security by ciphering the data packets, and handover support for wireless devices between eNBs. RLC sublayer 312 can provide segmentation and reassembly of upper-layer data packets, retransmission of lost data packets, and reordering of data packets to compensate for out-of-order reception due to hybrid automatic repeat request (HARQ). MAC sublayer 310 can provide multiplexing between logical and transport channels. MAC sublayer 310 is also responsible for allocating the various radio resources (e.g., resource blocks) in one cell among the wireless devices. MAC sublayer 310 is also responsible for HARQ operations.

In the control plane, the radio protocol architecture for the wireless device and eNB is substantially the same for physical layer 306 and L2 layer 308 with the exception that there is no header compression function for the control plane. The control plane also includes a radio resource control (RRC) sublayer 316 in Layer 3 (L3 layer). RRC sublayer 316 is responsible for obtaining radio resources (e.g., radio bearers) and for configuring the lower layers using RRC signaling between the eNB and the wireless device.

FIG. 4A is diagram illustrating an exemplary embodiment of a continuous carrier aggregation (CA) type communications channel. FIG. 4B is a diagram illustrating an exemplary embodiment of a non-continuous CA-type communications channel.

Wireless devices can use spectrum up to 20 MHz bandwidths allocated in a carrier aggregation (CA) of up to a total of 100 MHz (using 5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments conserve spectrum and are a good fit for the typically asymmetric bandwidth utilization by broadband subscribers.

Two types of carrier aggregation methods have been proposed, continuous CA (FIG. 4A) and non-continuous CA (FIG. 4B). Non-continuous CA occurs when multiple available component carriers are separated along the frequency band (FIG. 4B). Alternatively, continuous CA occurs when multiple available component carriers are adjacent to each other (FIG. 4A). Both non-continuous and continuous CA aggregates multiple LTE/component carriers to serve a single wireless device.

Multiple RF receiving units and multiple FFTs can be deployed with non-continuous CA because the carriers are separated along the frequency band. As non-continuous CA supports data transmissions over multiple, separated carriers across a large frequency range, propagation path loss, Doppler shift, and other radio-channel characteristics can vary largely at different frequency bands. Thus, to support broadband data transmission under the non-continuous CA approach, methods can be used to adaptively adjust coding, modulation, and transmission power for different component carriers. For example, where the eNB has fixed transmitting power on each component carrier, the effective coverage or supportable modulation and coding of each component carrier can be different.

Figure 5:
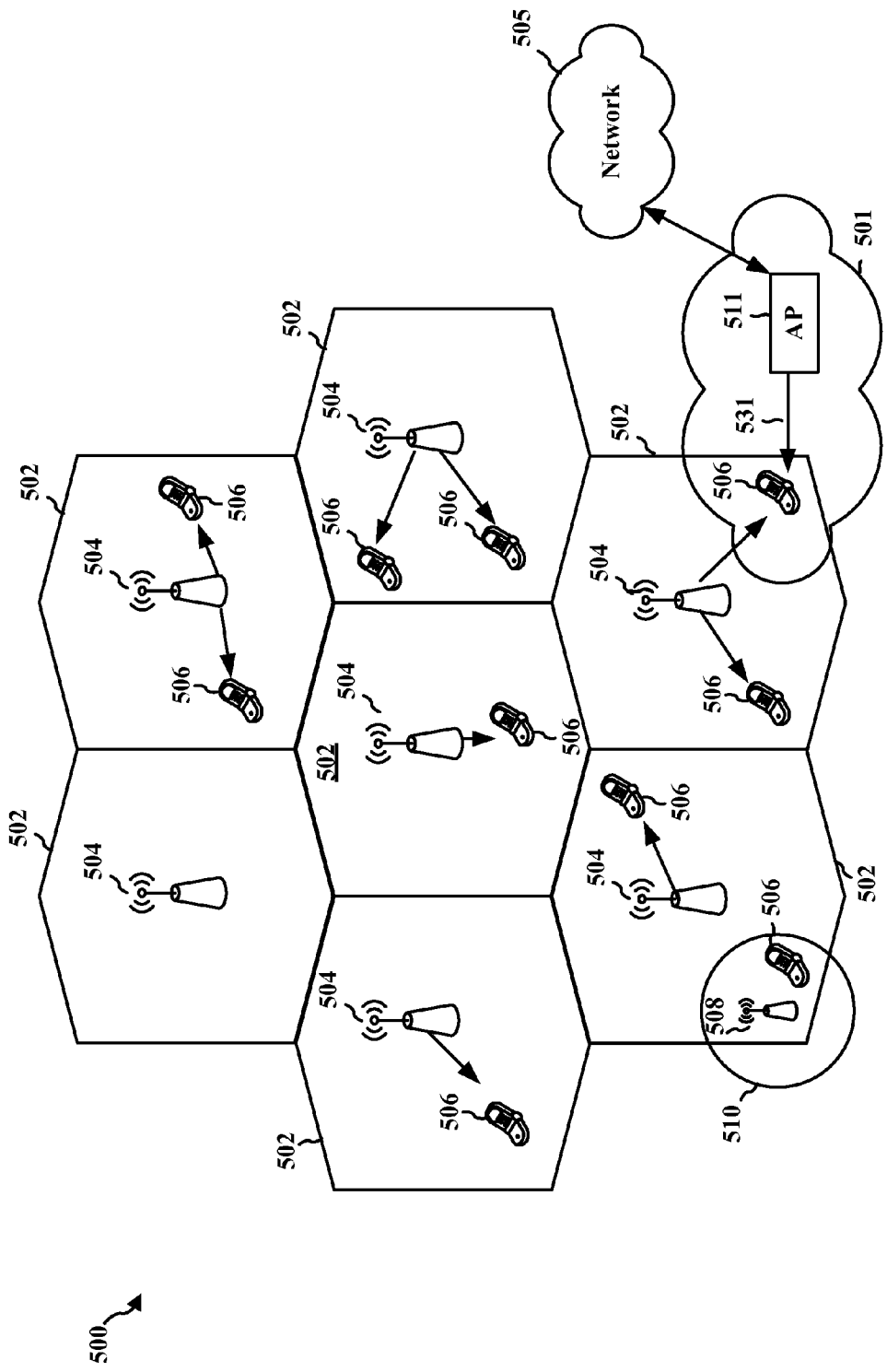
FIG. 5 is a conceptual diagram illustrating an exemplary embodiment of an access network and a wireless local-area network (WLAN)

FIG. 5 is a conceptual diagram illustrating an exemplary embodiment of an access network and a wireless local-area network (WLAN). Network 500 is similar to network 100 of FIG. 1 an includes an access network divided into cells 502 and serviced by macro eNBs 504 and micro eNB 508. A wireless device 506 can be within the cell of an eNB and a basic service set of an access point.

Basic service set 501 can be described as part of a WLAN, such as an IEEE 502.11 network. However, as those skilled in the art will readily appreciate, the various aspects described throughout this disclosure may be extended to other networks employing various standards or protocols including, by way of example, BLUETOOTH® (Bluetooth), HiperLAN (a set of wireless standards, comparable to the IEEE 502.11 standards, used primarily in Europe), and other technologies used in wide area networks (WAN)s, WLANs, personal area networks (PAN)s, or other suitable networks now known or later developed. The various aspects presented throughout this disclosure can be applicable to any suitable wireless network, regardless of the coverage range and the wireless access protocols utilized.

The wireless network can support any number of apparatuses. An apparatus may be any suitable wireless device capable of operating in a wireless environment, such as an access point (AP) or a wireless device or station (STA) operating in an IEEE 502.11-compliant network. AP 511 is generally a fixed terminal that provides backhaul services to wireless device 506 within its coverage region; however, AP 511 can be mobile in some applications. An AP can also be referred to as: a base station, a base transceiver station, a radio base station, a radio transceiver, a transceiver function, or any other suitable terminology. Wireless device 506 in the wireless network utilizes the backhaul services of AP 511 to connect to network 505, which can be a packet-based network, such as the Internet.

Basic Service Set (BSS) 501 includes AP 511 and wireless device 506. Although only wireless device 506 is shown in BSS 501 for simplicity, it is to be understood that the WLAN can include any number of wireless devices 506. AP 511 provides backhaul services to network 505 for wireless device 506 over a wireless channel over wireless link 531. Wireless device 506 gain access to the wireless channel using a carrier-sensing protocol. However, as those skilled in the art will appreciate, the various concepts described throughout this disclosure are equally applicable to any suitable apparatus, regardless of the protocol or standard used. BSS 501 can include AP 511 and associated wireless device 506 within basic service areas (BSA) for AP 511. Within BSS 501, AP 511 can act as a master to control wireless device 521. Each BSS 501 can be uniquely identified by a basic service set identification (BSSID). In some exemplary embodiments, the BSSID can be the media access control (MAC) address of the respective AP 511. In some exemplary embodiments, the BSA of BSS 501 can overlap with a cell of base station 504.

Wireless device 506 can be implemented with a protocol stack. The protocol stack can include: a physical layer for transmitting and receiving data in accordance with the physical and electrical specifications of the wireless channel, a data link layer for managing access to the wireless channel, a network layer for managing source to destination data transfer, a transport layer for managing transparent transfer of data between end users, and any other layers necessary or desirable for establishing or supporting a connection to a network.

Wireless device 506 can also include one or more software applications or other circuitry to enable a user to transmit, receive, and/or process data through a user interface. For the purpose of this disclosure, the term "data" shall be construed broadly to include voice, text, audio, video, and all other data generated or received by a user. The term "data" does not include information to control wireless device 506 such as, by way of example, the information contained in the beacon frames transmitted by AP 511. The user interface can include a keypad, display, speaker, microphone, joystick, and/or any other combination of user interface components that enable the user to interact with wireless device 506.

AP 511 can include software applications or other circuitry to enable respective associated wireless device 506 to connect to network 505 via link 531. AP 511 can send frames to wireless device 506 and receive frames from wireless device 506 to transfer data with wireless device 506, in addition to sending and/or receiving control information from wireless device 506.

AP 511 can establish link 531 with wireless device 506 when it is within a BSA of AP 511. Link 531 can comprise a communications channel that can enable both UL and DL communications. When connecting to AP 511, a wireless device such as wireless device 506 can first authenticate itself with AP 511 and then associate itself with AP 511. Once associated, link 531 can be established between AP 511 and wireless device 506. Once the link is established, AP 511 can send management frames and data frames through the direct communications channel.

Figure 6:
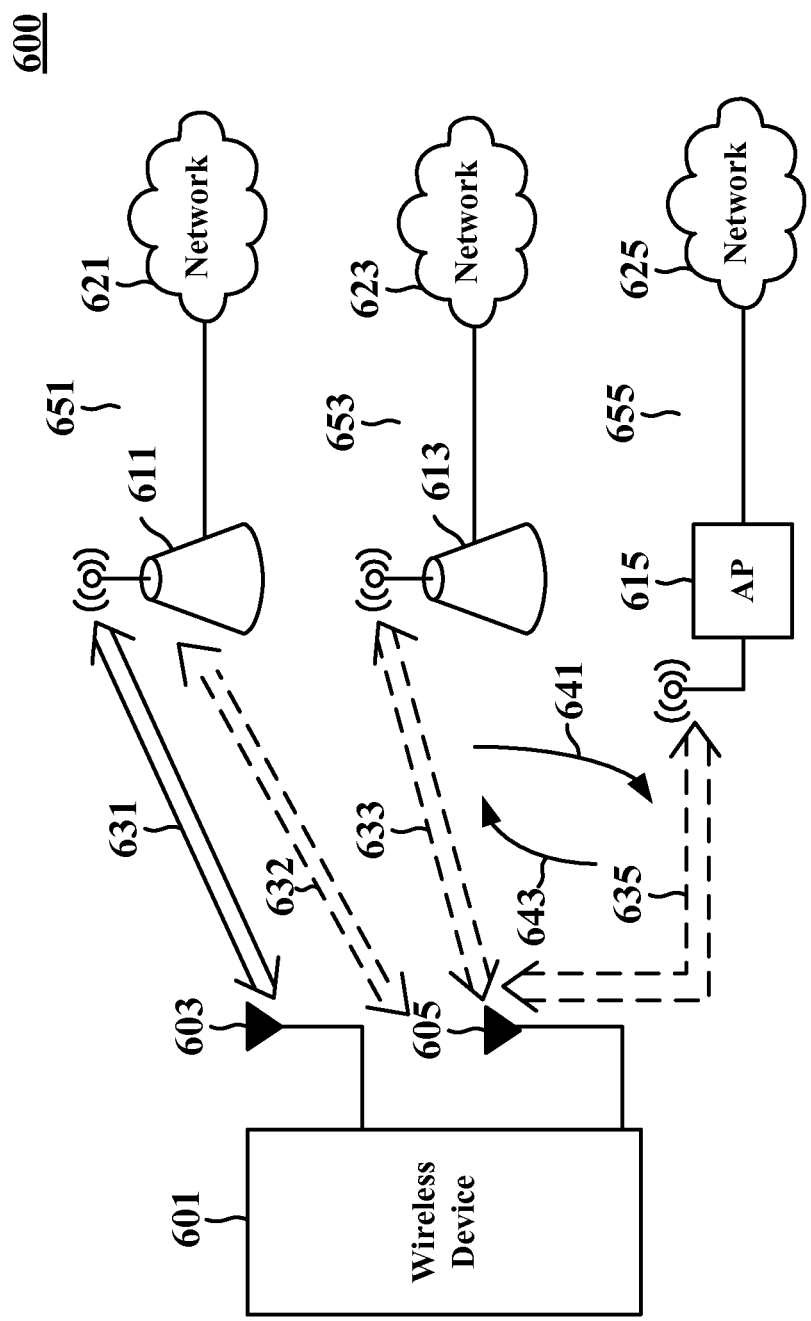
FIG. 6 is a conceptual diagram illustrating an exemplary embodiment of a wireless device switching communications with different wireless communications systems.

FIG. 6 is a conceptual diagram illustrating an exemplary embodiment of a wireless device establishing communications using multiple wireless communications systems. Communications system 600 can include a wireless device 601 accessing one or more networks 621-625 using a plurality of nodes 611-615. Wireless device 601 can include one or more antennas 603-605 to establish communications channels 631-635 with various cellular base stations 611-613 and/or access points 615. In some exemplary embodiments, wireless device 601 can include additional antennas to establish additional communications channels. In some exemplary embodiments, the additional communications channel can be established with the same base station 611-613 or access point 615; this can be done, for example, to establish carrier aggregation or establish FDD on multiple frequency bands. In some exemplary embodiments, wireless device can establish one or more additional communications channels with additional nodes 611-615.

Wireless systems 651, 653 may each be a Code Division Multiple Access (CDMA) system, a Global System for Mobile Communications (GSM) system, a Long Term Evolution (LTE) system, a wireless local area network (WLAN) system, or some other wireless system. A CDMA system may implement Wideband CDMA (WCDMA), CDMA 1X or cdma2000, Time Division Synchronous Code Division Multiple Access (TD-SCDMA), or some other version of CDMA. TD-SCDMA is also referred to as Universal Terrestrial Radio Access (UTRA) Time Division Duplex (TDD) 1.28 Mcps Option or Low Chip Rate (LCR). LTE supports both frequency division duplexing (FDD) and time division duplexing (TDD). For example, wireless system 651 may be a GSM system, and wireless system 653 may be a WCDMA system. As another example, wireless system 651 may be an LTE system, and wireless system 653 may be a CDMA system.

For simplicity, communications system 600 shows wireless systems 651, 653 each including one base station 613, 613. In general, each wireless system 651, 653 can include any number of base stations and any set of network entities. Each base station 651, 653 can support communication for wireless devices within the coverage of the base station. Base stations 651, 653 can also be referred to as a Node B, an evolved Node B (eNodeB or eNB), an access point, a base transceiver station, a radio base station, a radio transceiver, a transceiver function, a basic service set (BSS), an extended service set (ESS), or some other suitable terminology.

Base stations 611, 613 can establish communications links 631-633 with wireless devices in their respective cells and provide connections with networks 621, 623. In some exemplary embodiments, the network like network 623 can be a circuit-switching network. For example, In some exemplary embodiments, network 623 can be a circuit switching network like a public switching telephone network (PSTN). In such instances, base station 613 can establish communications link 633 to provide a connection for wireless device 601 to PSTN 623 through a network architecture for circuit-switching, such as a network using GSM protocols. In some exemplary embodiments, base station 611 can provide a connection to an IP network 621 through a cellular LTE architecture. In some exemplary embodiments, wireless device 601 can use multiple antennas to connect to the IP network using the cellular LTE architecture.

In some exemplary embodiments, when wireless device 601 establishes connection with the IP network that uses the LTE architecture, wireless device 601 can implement carrier aggregation by establishing multiple component carriers between the LTE base station(s) 611-613 and wireless device 601 such that bandwidth between wireless device 601 and the IP network is increased. In the illustrative embodiment, for example, wireless device can use two antennas 603, 605 to establish communications channels 631, 632 with base station 611. In other embodiments, wireless device 601 can use carrier aggregation when base station 613 also provides a connection to IP network 623 through a cellular LTE architecture; wireless device 601 can use antenna 605 to establish a communication channel 633 with base station 613. When establishing connections for carrier aggregation, wireless device 601 can maintain a primary component carrier (PCC) and a secondary component carrier (SCC).

Similarly, access point (AP) 615 can provide access for wireless device 601 to a network 625 through computer networking backhaul. In some exemplary embodiments, wireless device can use antenna 605 to establish communications channel 635 with AP 615. In some exemplary embodiments, wireless device 601 can switch between exchanging data with AP 615 to exchanging data with another device through another protocol. For example, wireless device 601 can use TDD to switch between communications link 635 with AP 615 and a connection with another device using Bluetooth. In some exemplary embodiments, networks 621, 623 can both be an IP network. In such instances, UL and DL communications to a second node in the IP network can be coordinated so that data is sent through both base station 611 and AP 615.

Wireless device 601 can be capable of communicating with the wireless system 100 and/or 102. Wireless device 601 can also be capable of receiving signals from broadcast stations, such as broadcast station 134. Wireless device 601 can also be capable of receiving signals from satellites, such as satellite 150, in one or more global navigation satellite systems (GNSS). Wireless device 601 can support one or more radio technologies for wireless communications, such as GSM, WCDMA, cdma2000, LTE, and 802.11 (e.g., a, b, ac, n), etc. The terms "radio technology", "radio access technology", "air interface", and "standard" can be used within this description interchangeably.

Wireless device 601 can communicate with a base station 611, 613 or an access point 615 in a wireless system via the downlink and the uplink. The downlink (or forward link) refers to the communications link from base station 611, 613 or access point 615 to wireless device 601, while the uplink (or reverse link) refers to the communications link from wireless device 601 to the base station 611, 613 or access point 615. Communication system 600 may utilize TDD and/or FDD. For TDD, the downlink and the uplink share the same frequency, and downlink transmissions and uplink transmissions can be sent on the same frequency in different time periods. For FDD, the downlink and the uplink are allocated separate frequencies; downlink transmissions can be sent on one frequency, and uplink transmissions can be sent on another frequency. Some exemplary radio technologies supporting TDD include GSM, LTE, and TD-SCDMA. Some exemplary radio technologies supporting FDD include WCDMA, cdma2000, and LTE.

In some exemplary embodiments, wireless device 601 can operate in one or more operating modes that actively transmit and receive data on one or more communications channels 631-635. For example, wireless device 601 can have a first mode using LTE that uses resources for using the SCC and exchanges data with base station (e.g., eNB) 611 using carrier aggregation, while having a second mode that uses a first channel (e.g., the PCC) for LTE communications and a second channel for communications with the access node using 802.11 protocols. In some exemplary embodiments, wireless device 601 can switch between two or more operating modes. In some exemplary embodiments, the switch between operating modes is based on user-defined preferences, periodic, or based on conditions in the network. For example, wireless device 601 can store user preferences such that a WiFi connection is used to supplement the LTE connection for large file downloads. In such instances, wireless device can switch from an LTE-only mode to an LTE and WiFi connection mode. Similarly, wireless device can switch from one mode using LTE and GSM connections to a second mode using LTE and WiFi connections. As will be discussed in further detail in relation to FIG. 12, In some exemplary embodiments, the type of connections that can be established for an operating mode can be based on the number of TX and RX chains included in wireless device 601.

In some exemplary embodiments, wireless device 601 can switch between operating modes while maintaining connections with nodes 611-613. When switching between modes, wireless device 601 can release resources corresponding to using the SCC while maintaining the connections for using the PCC. For example, wireless device can perform a tune-away operation 641 from base station 613 to AP 615, temporarily breaking the L2 connection with base station 613 while maintaining a network-level connection with base station 613. During tune-away 641, data communications between wireless device 601 and base station 613 can be suspended without tearing down communications channel 633. Similarly, wireless device can perform tune-away operation 643 to switch from an operating mode that exchanged data using communications channel 635 to an operating mode that exchanged data using communications channel 633.

In the illustrative embodiment, for example, wireless device 601 can have a first mode that enables 2X CA communications over LTE using communications channels 631, 633. Wireless device 601 can also have a second mode that enables 1X CA over LTE using channel 631 while enabling communications using WiFi using communications channel 635. Wireless device 601 can perform a wireless tune-away (WTA) operation 641 to temporarily switch from the first mode to the second mode by generating a channel quality indicator (CQI), which can be L1 feedback that signals that communications channel 633 is degraded. Wireless device 601 can generate and send the CQI to base station 613 independent of the actual conditions of the channel. As will be further discussed in relation to FIG. 8, in such instances, controller 859 can send command signals to channel estimator 856 to generate a CQI ramp down indication (indicating a degraded channel), overriding a CQI indicating the actual conditions of the channel. The degraded CQI can then cause base station 613 to suspend data communications with wireless device 601. Similarly, wireless device 601 can use a rank indicator (RI) to indicate that conditions are unfavorable to maintain communications on the established channel.

While data communications are suspended on channel 633, wireless device 601 during the WTA tune-away period can send an indication to AP 615 that it is active for data communications. Wireless device 601 and AP 615 can then perform data communications over channel 635. When the period for WTA operation 641 is over, wireless device can switch back to the first mode. In some exemplary embodiments, wireless device 601 can suspend communications over channel 635 by sending a power-saving mode (PSM) indication, such as an unscheduled automatic power save delivery (U-APSD) to AP 615; AP 615 can suspend data communications with wireless device 601. In some exemplary embodiments, AP 615 can buffer data until it receives another active notification from wireless device 601. In some exemplary embodiments, wireless device 601 can, when coming back from a WTA operation 641, send another CQI to base station 613 to indicate that the channel is ready for data communications. Similarly, wireless device 601 can send an RI to indicate that the channel has favorable conditions for communications. Wireless device 601 and base station 613 can resume exchange of data communications.

Similarly, wireless device can perform a LTE tune-away (LTA) operation 643 by temporarily switching from a second mode of joint LTE/WiFi communications to a first mode of 2X LTE communications before returning to the second mode. Other operating modes and tune-away methods are available based on the established connections maintained by wireless device 601. For example, wireless device can switch from a mode of joint LTE/GSM communications to a mode of joint LTE/WiFi communications.

In some exemplary embodiments, the switches between modes can be made without sending indication messages. In such instances, wireless device 601 can switch between modes in a similar manner to TDD is used to switch between frequency bands. In such instances, wireless device can use saved configuration information to change other components in addition to components in the transceiver to exchange data based on different communications protocols.

FIG. 7 is a table illustrating exemplary configurations of frame allocations for a wireless communications channel. Devices in a wireless system can use configuration table 700 to schedule respective uplink (UL), downlink (DL, and signaling (S) periods where each device is scheduled to send packets over a communications channel. For example, when establishing a channel 633 for LTE communications, wireless device 601 and base station 613 can use one of the UL/DL configurations (UL/DL CFG) to schedule times for transmissions in the physical downlink shared channel (PDSCH). Each configuration can have different switch periodicities. For example, UL/DL configurations 0-2 and 6 have a 5 ms switch periodicity, while UL/DL configurations 3-5 have a longer switch periodicity of 10 ms. In other embodiments, different switch periodicities can be specified for a UL/DL configuration.

In some exemplary embodiments, wireless device 601 can schedule itself to tune-away from channel 633 based on a chosen UL/DL configuration. For example, when wireless device 601 is receiving data from eNB 613 using a 0 configuration over channel 633, wireless device can tune-away from channel 633 during the scheduled UL frames (e.g., subframes 2-4 and 7-9) to be active in another channel, such as channel 635, where it can receive DL frames from AP 615. In such instances, wireless device may not need to send indication messages to eNB 613 or AP 615 to pause the DL packet transmissions.

In some exemplary embodiments, wireless device 601 can send generate and send indication messages to base station 613 and/or AP 615 to interrupt a chosen UL/DL configuration for a channel. For example, wireless device 601 can tune-away from one channel for a micro time frame (e.g., 1-2 ms), a short time frame (e.g., 20-50 ms), or a long time frame (e.g., greater than 50 ms).

In some exemplary embodiments, wireless device 601 can trigger an interruption of the active channel based on conditions of the channel or user-defined (e.g., case-based) conditions. In such instances, wireless device 601 can generate an indication message to the access node to suspend transmission of data. For example, wireless device 601 can generate a channel quality indication (CQI) message to eNB 613 that indicates a degraded channel to trigger eNB 613 to suspend DL data transmissions. In some exemplary embodiments, the generated CQI is based on the actual conditions of the channel. In other embodiments, the generated CQI is not based on the actual conditions of the channel; rather, wireless device 601 generates a CQI that indicates a degraded channel solely to trigger suspension of data transmissions so that wireless device 601 can tune away without missing any data transmissions.

Figure 8:
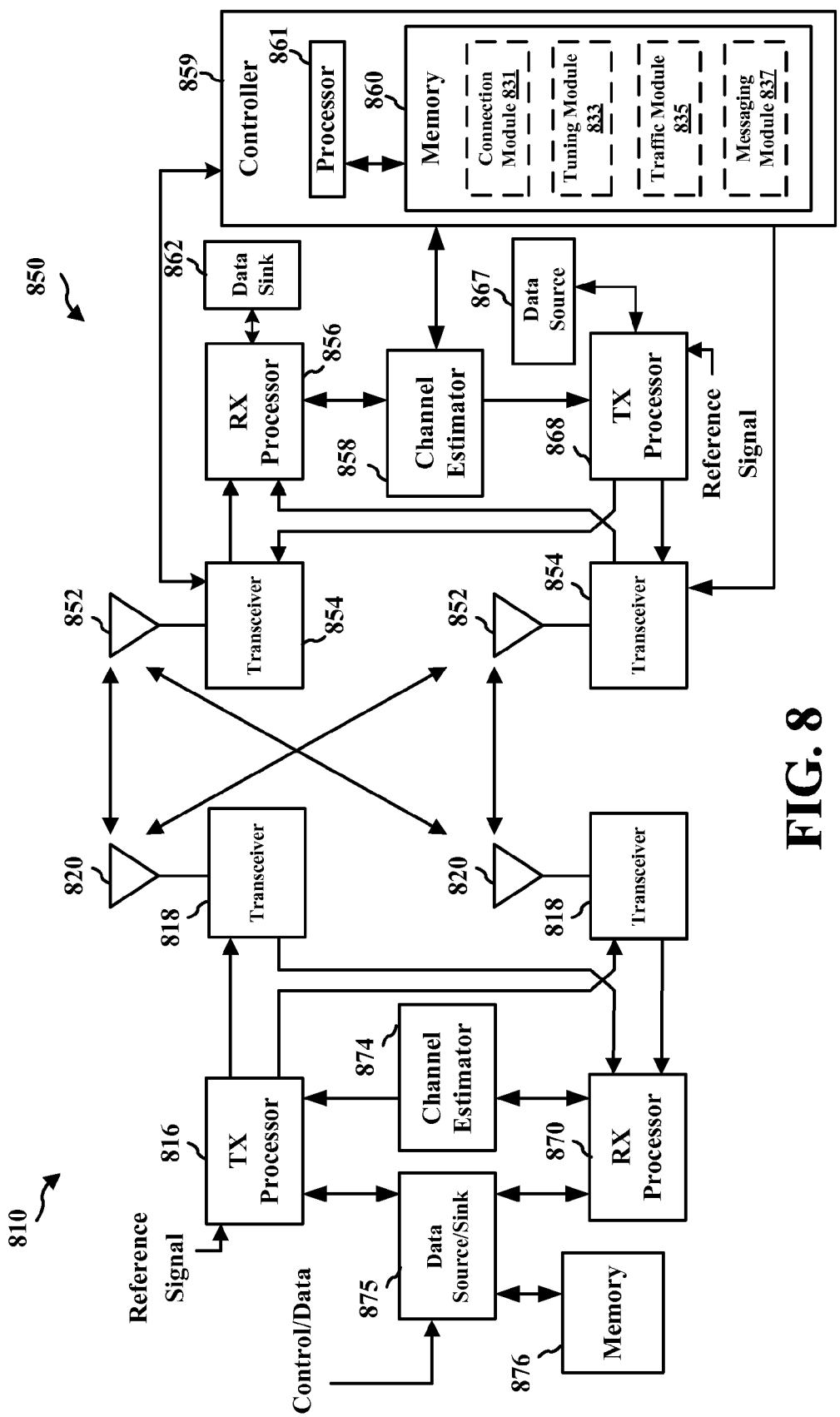
FIG. 8 is a conceptual diagram illustrating an exemplary embodiment of a transmitter and a receiver in an access network.

FIG. 8 is a conceptual diagram illustrating an exemplary embodiment of a transmitter and a receiver in an access network. FIG. 8 illustrates an eNB 810 in communication with a wireless device 850 in an access network. In the DL, upper-layer packets from the core network are provided to a data source/sink 875. Data source/sink 875 implements the functionality of the L2 layer. In the DL, data source/sink 875 provides header compression, ciphering, packet segmentation and reordering, multiplexing between logical and transport channels, and radio resource allocations to wireless device 850 based on various priority metrics. Data source/sink 875 is also responsible for HARQ operations, retransmission of lost packets, and signaling to wireless device 850.

Transmit (TX) processor 816 implements various signal-processing functions for the L1 layer (i.e., physical layer). The signal processing functions include coding and interleaving to facilitate forward error correction (FEC) at wireless device 850 and mapping to signal constellations based on various modulation schemes (e.g., binary phase-shift keying [BPSK[, quadrature phase-shift keying [QPSK], M-phase-shift keying [M-PSK], M-quadrature amplitude modulation [M-QAM]). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time-domain OFDM symbol stream. The OFDM stream is spatially precoded to produce multiple spatial streams. Channel estimates from channel estimator 874 may be used to determine the modulation-and-coding scheme (CMS), as well as for spatial processing. The channel estimate may be derived from a reference signal and/or channel-condition feedback transmitted by wireless device 850. Each spatial stream can then be provided to a different antenna 820 via a separate transceiver 818. Each transceiver 818 may modulate an RF carrier with a respective spatial stream for transmission.

At wireless device 850, each transceiver 854 receives a signal through its respective antenna 852. Each receiver RX 854 recovers information modulated onto an RF carrier and provides the information to receive (RX) processor 856. RX processor 856 implements various signal processing functions of the L1 layer. RX processor 856 can perform spatial processing on the information to recover any spatial streams destined for wireless device 850. If multiple spatial streams are destined for wireless device 850, they can be combined by the RX processor 856 into a single OFDM symbol stream. RX processor 856 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by eNB 810. These soft decisions may be based on channel estimates computed by the channel estimator 858. The soft decisions are then decoded and deinterleaved to recover the data and control signals that were originally transmitted by eNB 810 on the physical channel. The data and control signals are then provided to data sink 862.

Data sink 862 implements the L2 layer. In the UL, data sink 862 provides demultiplexing between transport and logical channels, packet reassembly, deciphering, header decompression, control signal processing to recover upper-layer packets from the core network. The upper-layer packets are provided to data sink 862, which represents all the protocol layers above the L2 layer. Various control signals may also be provided to data sink 862 for L3 processing. In some exemplary embodiments, data sink 862 is also responsible for error detection using an acknowledgement and/or negative acknowledgement (ACK/NACK) protocol to support HARQ operations.

In the UL, data source 867 is used to provide upper-layer packets to the TX processor 868. Data source 867 represents all protocol layers above the L2 layer. Similar to the functionality described in connection with the DL transmission by eNB 810, the data source 867 implements the L2 layer for the user plane and the control plane by providing header compression, ciphering, packet segmentation and reordering, and multiplexing between logical and transport channels based on radio resource allocations by eNB 810. In some exemplary embodiments, data source 867 is also responsible for HARQ operations, retransmission of lost packets, and signaling to eNB 810.

Channel estimator 858 can provide means for computing a channel quality indicator (CQI) from a reference signal and can provide means to provide the computed CQI to eNB 810. Channel estimates, such as a CQI, derived by a channel estimator 858 from a reference signal (e.g., a channel-state information reference signal (CSI-RS)) or feedback transmitted by eNB 810 may be used by TX processor 868 to select the appropriate modulation-and-coding schemes (MCS), to provide feedback to eNB 810, and to facilitate spatial processing. The spatial streams generated by TX processor 868 can be provided to different antenna 852 via separate transmitters TX 854. Transceiver 854 can modulate an RF carrier with a respective spatial stream for transmission.

The UL transmission is processed at eNB 810 in a manner similar to that described in connection with the receiver function at the wireless device 850. Each transceiver 818 receives a signal through its respective antenna 820. Each transceiver 818 recovers information modulated onto an RF carrier and provides the information to RX processor 870. RX processor 870 can implement the L1 layer.

Data source/sink 875 implements the L2 layer. Data source/sink 875 can be associated with memory 876 that stores program codes and data. Memory 876 can be referred to as a computer-readable medium. In the UL, data source/sink 875 provides demultiplexing between transport and logical channels, packet reassembly, deciphering, header decompression, control signal processing to recover upper layer packets from wireless device 850. Upper-layer packets from controller 685 can be provided to the core network. Data source/sink 875 is also responsible for error detection using an ACK and/or NACK protocol to support HARQ operations.

Controller 859 can be configured provide ways for switching transceiver 854 from a first operating mode to a second operating mod by moving a wireless connection from a cellular network 651 to an access point 615 while maintaining a network-layer connection to cellular network 651. In an aspect, controller 859 can be configured to provide ways to configure channel estimator 858 to generate a signal for transmission to cellular network 651 to switch from a first operating mode to a second operating mode. In an aspect, controller 859 can be configured to provide ways for switching transceiver 854 from a first operating mode to a second operating mode in response to a threshold level of bandwidth congestion during communications through cellular network 651 in the first operating mode. In some exemplary embodiments, for example, the signal can comprise a channel quality indicator.

In an aspect, channel estimator 858 can be configured to provide ways for computing a channel quality indicator from a reference signal transmitted from cellular network 651 and providing the computed channel quality indicator to cellular network 651. In an aspect, controller 859 can be configured to provide ways for overriding the computed channel quality indicator provided to cellular network 651 to switch transceiver 854 between a first operating mode and a second operating mode. In an aspect, controller 859 can be configured to provide ways to generate a signal for transmission to access point 615 to switch transceiver 854 from the second operating mode to the first operating mode. In an aspect, the signal can be configured to provide an indication to access point 615 that transceiver 854 is operating in a power-saving mode.

Controller 859 can be associated with memory 860 that stores program codes and data and processor 861 that implements instructions provided by programs in memory 860. Memory 860 may be referred to as a computer-readable medium. As will be further discussed in relation to FIG. 13, memory 860 can include one or more data structures and/or modules 831-837 to enable wireless device 850 to perform operations to enable communications in one or more operating modes; the operating modes can have wireless device 850 maintain wireless communications channels with one or more cellular base stations and/or non-cellular access points to connect with a network. Controller 859 is responsible for the execution of software instructions stored in memory 860. Controller 859 can load instructions from modules, including modules 831-837, and execute processes in accordance with the local instructions. In some exemplary embodiments, Controller 859 can include one or more processors that are coordinated to perform processes for wireless device 850.

Memory 860 can include a non-transitory computer-readable medium (e.g., one or more nonvolatile memory elements) that may include any number of software modules. Each software module can include a set of instructions that, when executed by controller 859, cause wireless device 850 to perform various functions. In the illustrative embodiment, for example, memory 860 includes connection module 831, tuning module 833, traffic module 835, and messaging module 837.

Several embodiments of wireless device 850 may include one or more of connection module 831, tuning module 833, traffic module 835, and messaging module 837. In some exemplary embodiments, all of the software modules 831-837 can be enabled to perform various aspects of the wireless connection and tune-away algorithms. In some exemplary embodiments, one of the software modules may be enabled, while one or more of the others software module remains dormant. The software modules that are dormant can be activated later in the field or at the factory to implement, for example, an upgrade in services. In some exemplary embodiments, only one of the software modules can be loaded into memory 860. In the case of a wireless device 850 with only part of the software modules 831-837 loaded into memory 860 at the factory, wireless device 850 may or may not be capable of being programmed later in the field, or at the factory, with the other software module. The actual implementation of wireless device 850 will depend on a variety of factors, including consumer demand, performance parameters, pricing, and other relevant factors.

Connection module 831 can, for example, provide instructions for controller 859 for ways to establish communications with other devices. In some instances, connection module 831 provides instructions for controller 859 to, for example, establish UL and DL channels with a eNB 810. Similarly, connection module 831 can provide instructions for controller 859 to establish communications channels with a Node B in a cellular network to connect to a circuit-switching network through a packet core using a protocol like GSM. In some instances, connection module 831 can provide instructions for controller 859 to, for example, establish communications channels with an IP network through an access point. In some exemplary embodiments, connection module 831 can provide instructions for controller 859 to suspend and/or resume data transfer on an established communications channel. This can occur, for example, when wireless device 850 is tuning away from the established communications channel or when wireless device 850 is tuning to the established communications channel, respectively.

Tuning module 833 can provide instructions for controller 859 to, for example, adjust components in wireless device 850 to send and receive data packets on one of a plurality of established communications channels. In some exemplary embodiments, tuning module 833 can provide instructions for controller 859 to generate indication information for receiving nodes that wireless device is suspended or active to send and/or receive data transmissions over the communications channel. In some exemplary embodiments, tuning module 833 can also provide instructions for controller 859 to determine times to tune away from one established communications channel to another established communications channel.

For example, controller 859 of wireless device 850 can use instructions provided by connection module 831 to establish communications channels 633, 635 with base station 613 and AP 615, respectively. During a tune-away operation, controller 859 can use instructions provided by tuning module 833 to change the active communications channel from channel 633 with base station 613 to channel 635 with AP 615. In some exemplary embodiments, controller 859 can use instructions provided by tuning module 833, for example, send command signals to channel estimator 858 to generate a degraded CQI and use instructions provided by messaging module 837 to generate a CQI ramp-down message that is sent to eNB 810. In some exemplary embodiments, controller 859 can also use instructions provided by tuning module 833 to generate a power-saving mode (PSM) active message and use instructions provided by messaging module 837 to generate a PSM frame to an AP like AP 615 to indicate that wireless device 850 is active to receive data communications over channel 635.

Traffic module 835 can provide instructions for controller 859 to, for example, determine traffic conditions in an established communications channel. For example, controller 859, using instructions loaded from traffic module 835, can retrieve characteristics of the communications channel from channel estimator 858, such as congestion levels. In some exemplary embodiments, traffic module 835 can provide instructions for controller 859 to generate a CQI that indicates acceptable congestion conditions or degraded congestion conditions. In some exemplary embodiments, controller 859 can also use instructions provide by tuning module 833 to generate the CQI independent of measured traffic conditions.

Messaging module 837 can provide instructions for controller 859 to, for example, generate messages in the form of frames, data packets, or other packet forms, and send the generated packets through transceiver 854 and a communications channel. In some exemplary embodiments, messaging module 837 can provide instructions for controller 859 to retrieve information included in a message, frame, or packet received by wireless device 850 through transceiver 854.

For example, wireless device 850 can receive a message, such as data message in a data frame received from an AP through transceiver 854. Messaging module 837 can be used to open the data frame that included the data message. Messaging module 837 can then be used to retrieve the information included in the data message. In another example, messaging module 837 can be used to package information, such as data, a CQI ramp-down indication (indicating an degraded channel), a CQI ramp-up indication (indicating an acceptable channel), a PS mode suspend indication, a PS mode active indicator, etc., into a message. In some exemplary embodiments, messaging module 837 can be used to provide the message by including the message in a frame or other messaging unit for the applicable communications channel. For example, data, a PS mode suspend indication and/or a PS mode active indication can be included in a message that is in turn included in a data frame, probe request frame, or an action frame. In such instances, wireless device 850 can send the frame that includes the information through transceivers 854 to the AP.

Figure 9:
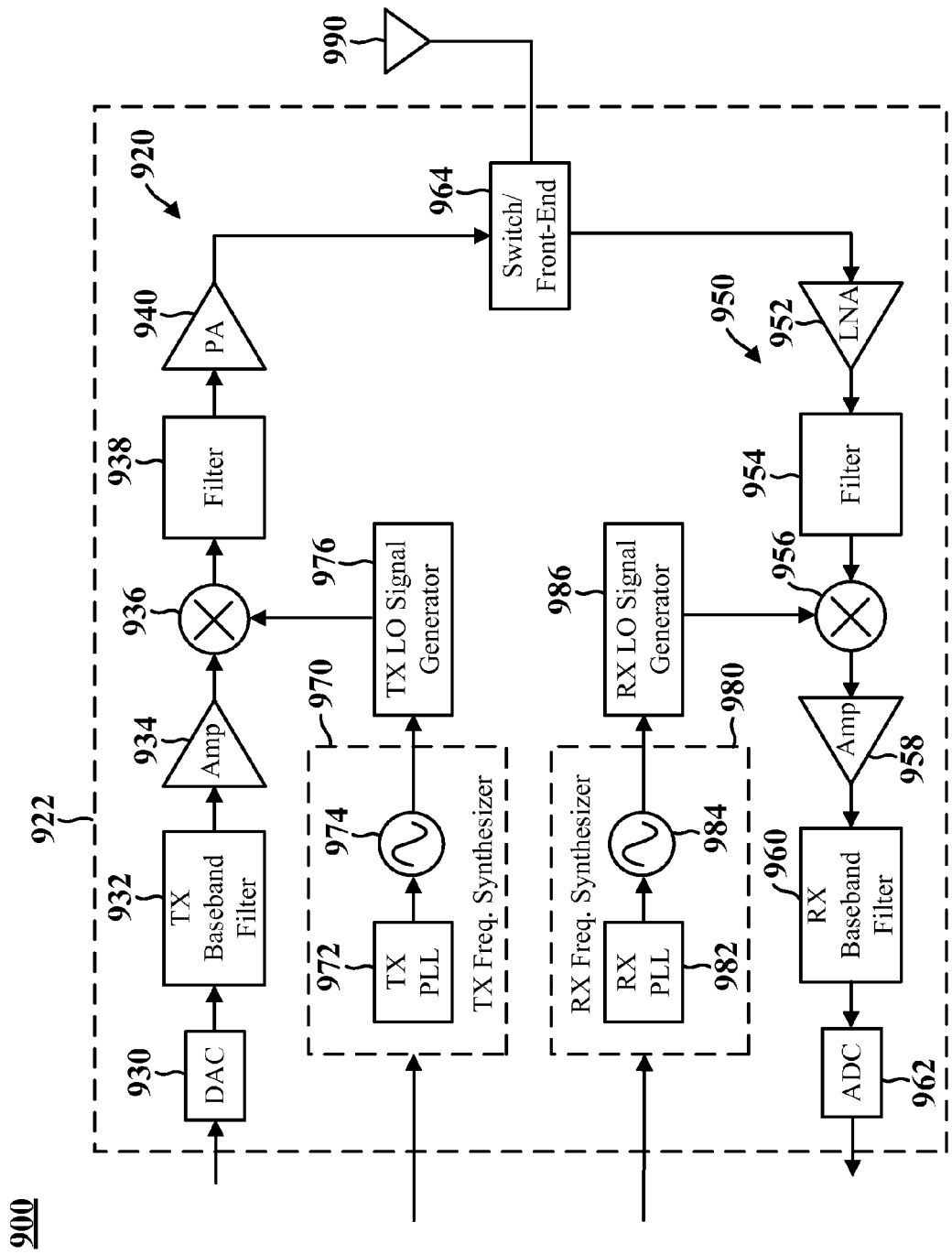
FIG. 9 is a conceptual diagram illustrating an exemplary embodiment of a wireless device for transmission and reception of wireless communications.

FIG. 9 is a block diagram 900 of an exemplary wireless device, such as the wireless device 106, 202, 506, 601, and/or 850. The wireless device includes a transceiver 922, and an antenna 990. The transceiver 922 includes a transmitter 920 and a receiver 950 that support bi-directional communication. Transmitter 920 and/or receiver 950 can be implemented with a super-heterodyne architecture or a direct-conversion architecture. In the super-heterodyne architecture, a signal is frequency converted between RF and baseband in multiple stages, e.g., from RF to an intermediate frequency (IF) in one stage, and then from IF to baseband in another stage for a receiver. In the direct-conversion architecture, which is also referred to as a zero-IF architecture, a signal is frequency converted between RF and baseband in one stage. The super-heterodyne and direct-conversion architectures may use different circuit blocks and/or have different requirements. In the exemplary design shown in FIG. 9, transmitter 920 and receiver 950 are implemented with the direct-conversion architecture.

FIG. 9 is a conceptual diagram illustrating an exemplary embodiment of a wireless device for transmission and reception of wireless communications. In some embodiments, wireless device 900 can configure transmitter 920 and/or receiver 950 independently to operate in the first and/or second mode. In the transmit path, data to be transmitted and can be provided the data to digital-to-analog converter (DAC) 930. DAC 930 converts a digital input signal to an analog output signal. The analog output signal is provided to transmit (TX) baseband (low-pass) filter 932, which can filter the analog output signal to remove images caused by the prior digital-to-analog conversion by DAC 930. Amplifier (amp) 934 can amplify the signal from TX baseband filter 932 and provide an amplified baseband signal. Up-converter (mixer) 936 can receive the amplified baseband signal and a TX local oscillator (LO) signal from TX LO signal generator 976. Up-converter 936 can up-convert the amplified baseband signal with the TX LO signal and provide an up-converted signal. Filter 938 can filter the up-converted signal to remove images caused by the frequency up-conversion. Power amplifier (PA) 940 can amplify the filtered RF signal from filter 938 to obtain the desired output power level and provide an output RF signal. The output RF signal can be routed through a switch/front-end 964.

For FDD, transmitter 920 and receiver 950 can be coupled to switch/front-end 964, which can include a TX filter for transmitter 920 and a receiver (RX) filter for receiver 950. The TX filter can filter the output RF signal to pass signal components in a transmit band and attenuate signal components in a receive band. For TDD, the transmitter 920 and the receiver 950 may be coupled to switch/front-end 964. For TDD, switch/front-end 964 can pass the output RF signal from transmitter 920 to antenna 990 during uplink time intervals. For both FDD and TDD, switch/front-end 964 can provide the output RF signal to antenna 990 for transmission via a wireless channel.

In the receive path, antenna 990 can receive signals transmitted by base stations, access points, and/or other transmitter stations and can provide a received RF signal. The received RF signal can be routed through switch/front-end 964. For FDD, the RX filter within switch/front-end 964 can filter the received RF signal to pass signal components in a receive band and attenuate signal components in the transmit band. For TDD, switch/front-end 964 can pass the received RF signal from antenna 990 to receiver 950 during downlink time intervals. For both FDD and TDD, switch/front-end 964 can provide the received RF signal to the receiver 950.

Within receiver 950, the received RF signal may be amplified by low-noise amplifier (LNA) 952 and filtered by filter 954 to obtain an input RF signal. Down-converter (mixer) 956 can receive the input RF signal and an RX LO signal from RX LO signal generator 986. The down-converter 956 can down-convert the input RF signal with the RX LO signal and provide a down-converted signal. The down-converted signal can be amplified by amplifier 958 and further filtered by RX baseband (low-pass) filter 960 to obtain an analog input signal. The analog input signal is provided to an analog-to-digital converter (ADC) 962. ADC 962 converts an analog input signal to a digital output signal.

TX frequency synthesizer 970 can include a TX phase-locked loop (PLL) 972 and a voltage-controlled oscillator (VCO) 974. VCO 974 can generate a TX VCO signal at a desired frequency. TX PLL 972 generate a control signal for VCO 974. The control signal can adjust the frequency and/or the phase of VCO 974 to obtain the desired frequency for the TX VCO signal. TX frequency synthesizer 970 provides the TX VCO signal to TX LO signal generator 976. TX LO signal generator 976 can generate a TX LO signal based on the TX VCO signal received from TX frequency synthesizer 970.

RX frequency synthesizer 980 can include RX PLL 982 and VCO 984. VCO 984 can generate an RX VCO signal at a desired frequency. RX PLL 982 generate a control signal for VCO 984. The control signal can adjust the frequency and/or phase of VCO 984 to obtain the desired frequency for the RX VCO signal. RX frequency synthesizer 980 provides the RX VCO signal to RX LO signal generator 986. RX LO signal generator 986 can generate an RX LO signal based on the RX VCO signal received from RX frequency synthesizer 980.

LO signal generators 976, 986 can each include frequency dividers, buffers, etc. LO signal generators 976, 986 can be referred to as frequency dividers when they divide a frequency provided by TX frequency synthesizer 970 and RX frequency synthesizer 980, respectively. PLLs 972, 982 can each include a phase/frequency detector, a loop filter, a charge pump, a frequency divider, etc. Each VCO signal and each LO signal can be a periodic signal with a particular fundamental frequency. The TX LO signal and the RX LO signal from LO generators 976, 986 can have the same frequency for TDD or different frequencies for FDD. The TX VCO signal and the RX VCO signal from VCOs 974, 984 can have the same frequency (e.g., for TDD) or different frequencies (e.g., for FDD or TDD).

The conditioning of the signals in transmitter 920 and receiver 950 can be performed by one or more stages of amplifier, filter, up-converter, down-converter, etc. These circuits can be arranged differently from the configuration shown in FIG. 9. Furthermore, other circuits not shown in FIG. 9 can also be used to condition the signals in transmitter 920 and receiver 950. For example, impedance matching circuits can be located at the output of PA 940, at the input of LNA 952, between antenna 990 and switch/front-end 964, etc. Some circuits in FIG. 9 can also be omitted. For example, filter 938 and/or filter 954 can be omitted. All or a portion of transceiver 922 can be implemented on one or more analog integrated circuits (ICs), RF ICs (RFICs), mixed-signal ICs, etc. For example, TX baseband filter 932 to PA 940 in transmitter 920, LNA 952 to RX baseband filter 960 in receiver 950, PLLs 972, 982, VCOs 974, 984, and LO signal generators 976, 986 can be implemented on an RFIC. PA 940 and possibly other circuits can also be implemented on a separate IC or a circuit module.

Figure 10:
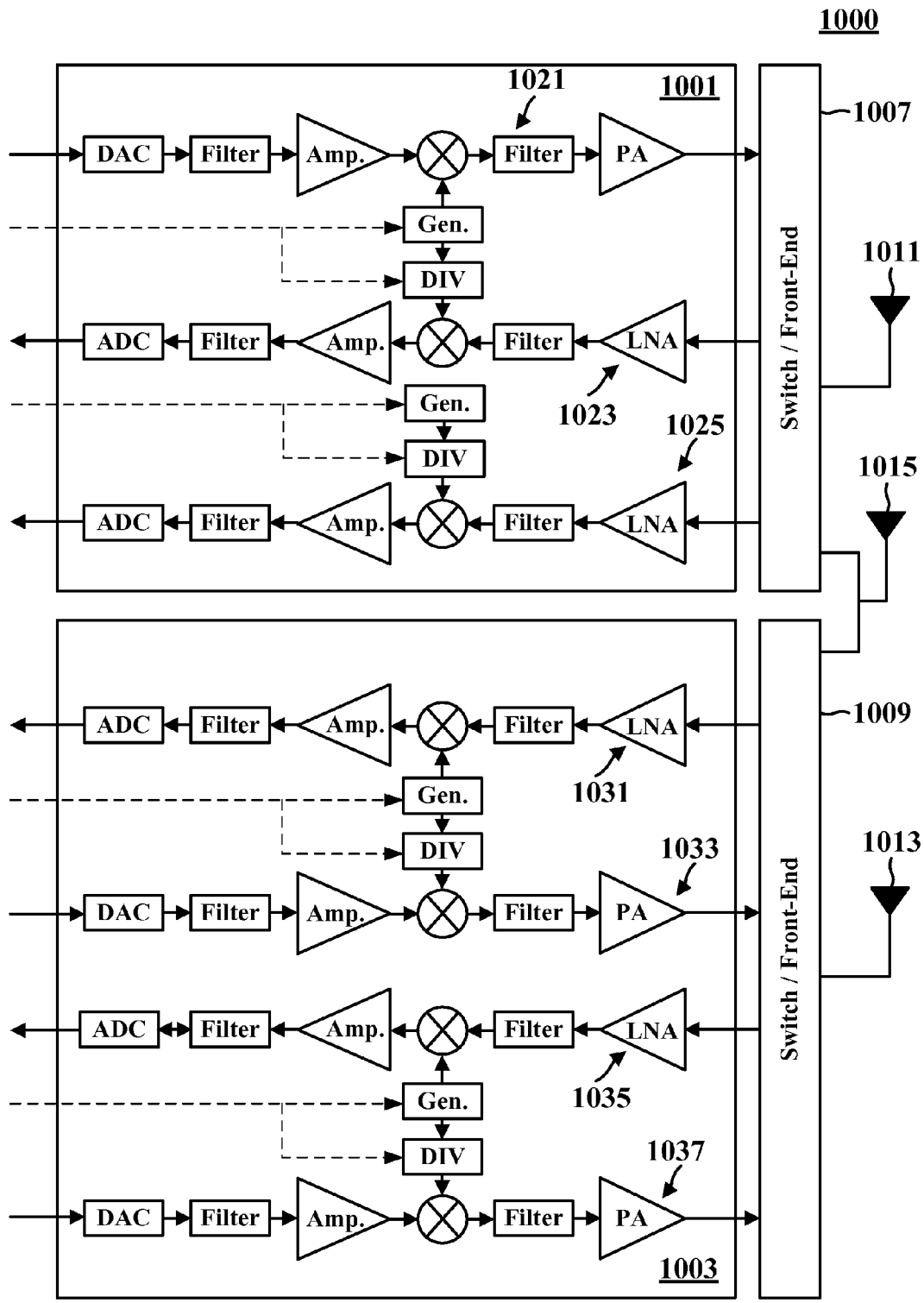
FIG. 10 is a conceptual diagram illustrating an exemplary embodiment of a wireless device.

FIG. 10 is a conceptual diagram illustrating an exemplary embodiment of a wireless device. Wireless device 1000 is similar to wireless device 106, 202, 506, 601, 850 and/or 900 and can include transceivers 1001, 1003, switches/front-ends 1007, 1009, and antennas 1011-1015. Wireless device 1000 can use transceivers 1001, 1003 that include one or more of TX chains and RX chains to enable communications on one or more communications channels. The TX chains and RX chains can operate in a similar manner as TX chain 920 and RX chain 950 respectively, of block diagram 900. Transceiver 1001 includes one TX chain 1021 and two RX chains 1023, 1025. Transceiver 1003 includes two TX chains 1031, 1035, and two RX chains 1033, 1037. In some exemplary embodiments, transceivers 1001, 1003 can include more or less TX chains and/or RX chains.

Transceiver 1001 can be configurable by a controller, like controller 859 for operating in specified modes. Transceiver 1001 can be configurable by controller 859 to provide ways for supporting first communications through a cellular network 651 to at least one of a packet-based network and a circuit-switched network. Transceiver 1003 can configurable by controller 859 operating in specific modes. Transceiver 1003 can be configurable by controller 859 to provide ways for operating with the transceiver 1001 to support communications through the cellular network 651 in a first mode and configurable by controller 859 for supporting second communications through an access point 615 to the packet-based network 625 in a second mode.

In some exemplary embodiments, transceivers 1001, 1003 can be configured to provide ways to support communications through cellular network 651 using carrier aggregation in a first mode. In an aspect, transceiver 1003 can be configured to provide ways to support third communications through cellular network 651 to a circuit-switched network in a third mode.

Each TX chain and/or RX chain 1021-1025, 1031-1037 can receive command signals that configure the respective signal generators and dividers connected to the TX and RX chains. The signal generators and dividers can be configured such that the respective chains operate at the applicable frequency. For example, the mixer in RX chain 1031 can be configured to operates at 2.4 GHz or 5 GHz when connecting to AP 615 over channel 635. In some exemplary embodiments, the frequency of the TX or RX chain does not change when switching between communications channels. For example, when wireless device 1000 establishes connections with base station 613 and AP 615 at the 2.4 GHz frequency band, RX chain 1031 does not need to change frequency when tuning away from channel 633 to operate using channel 635.

In some exemplary embodiments, the operating mode of wireless device 1000 can be based on the number of TX chains and RX chains included in transceivers 1001, 1003. In the illustrative embodiment, for example, wireless device 1000 can include an operating mode that enables 2X CA for receiving data through LTE by using all four of RX chains 1023, 1025, 1031, 1037 in transceivers 1001, 1003. In a similar manner, RX chain 1031 and TX chain 1033 can switch between one mode that supports communications over a GSM channel and switches modes to support LTE over a different channel. In the illustrative embodiment for example, other modes supported by at least one of transceivers 1001, 1003 using the four available RX chains can include communications channels for: LTE with CA (including 1×, 1.5×, and 2×), GSM, WiFi (including 2×2), 1×1 direct broadcast satellite (DBS), and 1×1 SBS. Other operating modes can be configured for wireless transceiver 1000 based on the type of mode (e.g., receiving mode) and the number of applicable TX/RX chains are available to support communications on a channel once it is established.

Figure 11:
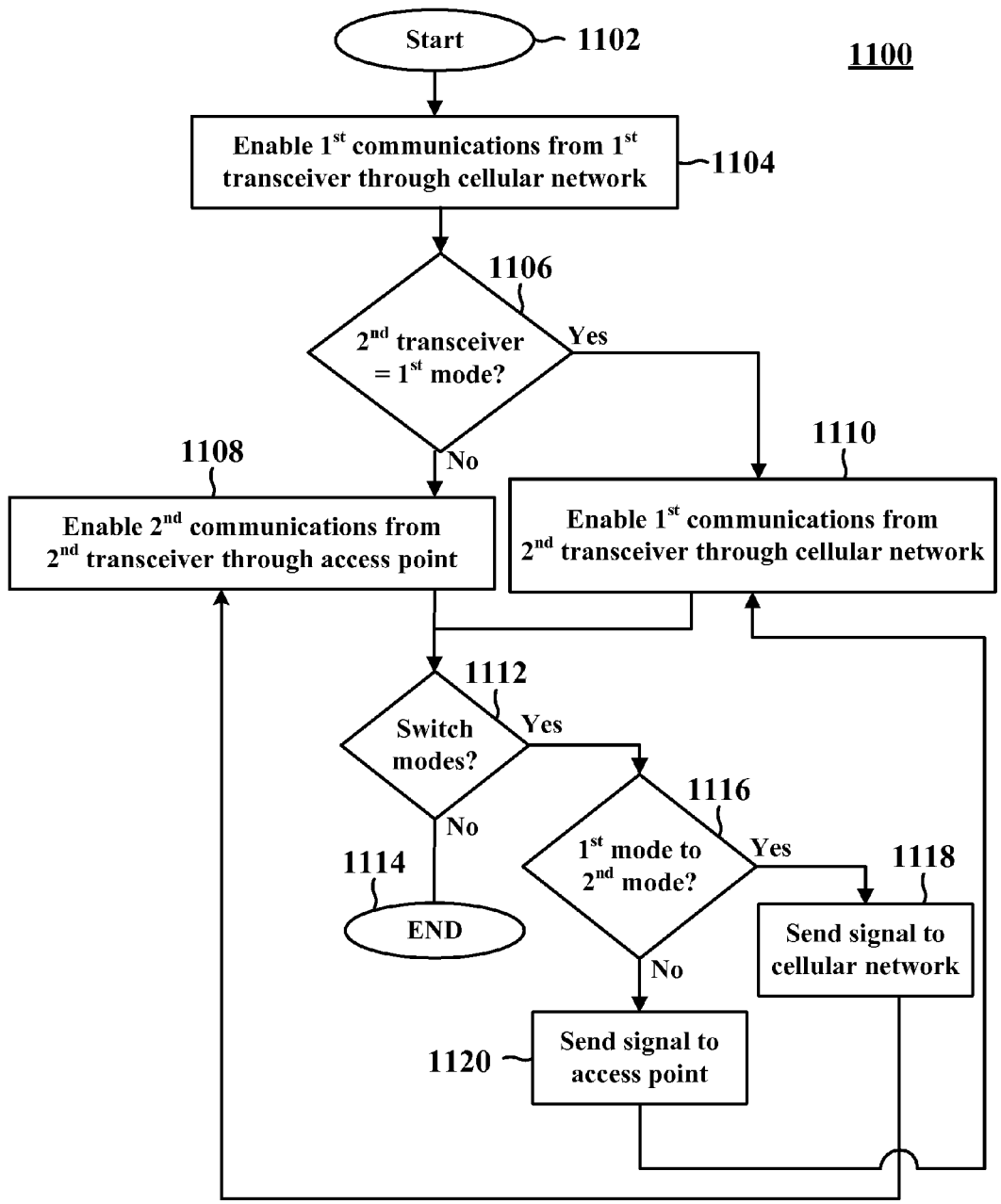
FIG. 11 is a flow chart illustrating an example of a tune-away operation by a wireless device.

FIG. 11 is a flow chart illustrating an example of a tune-away operation by a wireless device. FIG. 11 provides an example of an algorithm implemented by a controller 859 and transceivers 1001, 1003 described earlier in connection with FIGS. 8 and 10. Method 1000, when implemented by a processor, provides a means for supports a first and second mode to connect to a network, while operating in one of the first or second modes. Wireless device 106, 202, 506, 601, 850, 900 and/or 1000 can perform method 1100 when using components to transmit data or signaling communications with an access node for access to a packet network or circuit switching network.

Method 1100 can start at 1102 and at 1104, the wireless device can enable first communications from a first transceiver through a cellular network. For example, wireless device 850 can use transceiver 854 to establish a first communications channel 631 with a cellular base station 611. In some exemplary embodiments, transceiver 854, 1001, 1003 can use multiple TX and/or RX chains 1021-1025 to exchange communications with base station 611. In some exemplary embodiments, base station 611 can provide communications to a packet network like IP network 621 through, for example, an LTE architecture. In other embodiments, base station 611 can provide communications to a circuit-switching network through, for example, a GSM architecture.

After establishing first communications, the wireless device at 1106 can determine whether the second transceiver is operating in a first operating mode. Wireless device 601, 850 can be configured to operate in one of multiple operating modes. When wireless device 601, 850 determines it is operating in the first mode, at 1110, it establishes first communications from transceiver 1001, 1003 through base station 611, 613 to the packet-based network or circuit-switched network through a cellular network architecture like LTE or GSM. Alternatively, when wireless device 601, 850 determines it not operating in the first mode (e.g., in the illustrative embodiment, it is operating in the second mode), at 1108 it establishes second communications from transceiver 1001, 1003 through AP 615 to packet network 625 through a network backhaul.

For example, wireless device 601, 850, 1000 can be configured to operate in a first mode by having transceiver 1001, 1003 establish first communications with base station 611 or 613 to connect to a packet network or a circuit-switching network through the cellular network. Similarly, wireless device 601, 850, 1000 can be configured to operate in a second mode by having transceiver 1001, 1003 establish second communications with AP 615 to connect to a packet network 625 through a backhaul network. When wireless device 601, 850, 1000 at 1106 determines it is operating in the first mode, at 1110, it establishes channel 632 or 633 to a base station 611 or 613. When wireless device 601, 850, 1000 at 1106 determines it is operating in the second mode, at 1108 it establishes channel 635 to AP 615.

Later, at 1112, the wireless device can determine whether to switch modes. Wireless device 601, 850, 1000 can determine to switch modes in order to perform a tune-away operation, switching from active communications on one channel to active communications on another channel while maintaining the connection to the first channel. In some exemplary embodiments, the maintained connection is a network-layer connection between the wireless device and the active node. If at 1112, the wireless device determines not to switch modes, method 1100 ends at 1114. Otherwise, when the wireless device determines to switch modes at 1112, the wireless device determines whether it is switching from the first mode to the second mode (in which case, it performs actions at 1118 and 1108), or it is switching from the second mode to the first mode (in which case, it performs actions at 1120 and 1110).

For example, wireless device 601, 850, 1000 can be operating in the first mode when, at 1112, it determines to switch modes. At 1116, it determines it is switching from the first mode to the second mode. In some exemplary embodiments, the switch from the first mode to the second mode can be a WTA tune-away operation, switching from communication with base station 613 on channel 633 to communication with AP 615 on channel 635. In some exemplary embodiments, wireless device 601, 850, 1000 can optionally at 1118 send a signal to the cellular network. In some exemplary embodiments, the signal can be an indication like a CQI ramp down message that indicates a degraded channel between wireless station 601, 850, 1000 and base station 613. After optionally sending an indication message to the cellular network, wireless device can at 1108 enable communications on the channel 635 to AP 615.

In another example, wireless device 601, 850, 1000 can be operating in the second mode when, at 1112, it determines to switch modes. At 1116, it determines it is not switching from the first mode to the second mode. In some exemplary embodiments, the switch from the second mode to the first mode can be a LTA tune-away operation, switching from communication with AP 615 on channel 635 to communication with base station 613 on channel 633. In some exemplary embodiments, wireless device 601, 850, 1000 can optionally at 1130 send a signal to AP 615. In some exemplary embodiments, the signal can be an indication like a PSM suspend message that indicates that wireless station 601, 850, 1000 is going into PSM and will not receive data packets. After optionally sending an indication message to AP 615, wireless device 601, 850, 1000 can at 1110 enable communications on the channel 633 to base station 613.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

What is claimed is:

1. An apparatus for wireless communications at a user equipment (UE), comprising:
    a controller;
    a first transceiver configurable by the controller to support first communications through a cellular network to at least one of a packet-based network and a circuit-switched network; and
    a second transceiver configurable by the controller to:
        operate with the first transceiver to support first communications through the cellular network in a first mode, and
        support second communications through an access point to the packet-based network in a second mode.

2. The apparatus of claim 1, wherein the controller is configured to switch the second transceiver from the first mode to the second mode by moving its wireless connection from the cellular network to the access point while maintaining a network-layer connection to the cellular network.

3. The apparatus of claim 1, wherein the first and second transceivers are further configurable by the controller to:
    support the first communications through the cellular network using carrier aggregation in the first mode.

4. The apparatus of claim 1, wherein the second transceiver is further configurable by the controller to:
    support third communications through the cellular network to the circuit-switched network in a third mode.

5. The apparatus of claim 1, wherein the controller is further configured to:
    configure a channel estimator to generate a signal for transmission to the cellular network to enable the second transceiver to switch from the first mode to the second mode.

6. The apparatus of claim 5, wherein the signal comprises one of a channel quality indicator or a rank indicator.

7. The apparatus of claim 5, wherein the channel estimator is further configured to:
    compute a channel quality indicator from a reference signal transmitted from the cellular network, and
    provide the computed channel quality indicator to the cellular network, wherein the controller is further configured to override the computed channel quality indicator provided to the cellular network to switch the second transceiver between the first mode and the second mode.

8. The apparatus of claim 1, wherein the controller is further configured to generate a signal for transmission to the access point to enable the second transceiver to switch from the second mode to the first mode, wherein the signal is configured to provide an indication to the access point that the second transceiver is operating in a power-saving mode.

9. The apparatus of claim 1, wherein the controller is further configured to switch the second transceiver from the first mode to the second mode in response to a threshold level of bandwidth congestion during first communications through the cellular network in the first mode.

10. The apparatus of claim 1, wherein only one of the transmitter portion or the receiver portion of the second transceiver is configured by the controller.

11. A method of wireless communications at a user equipment (UE), comprising:
    configuring a first transceiver to support first communications through a cellular network to at least one of a packet-based network and a circuit-switched network; and
    configuring a second transceiver to support first communications through the cellular network in a first mode with the first transceiver, and second communications through an access point to the packet-based network in a second mode.

12. The method of claim 11, further comprising:
    switching the second transceiver from the first mode to the second mode by moving its wireless connection from the cellular network to the access point, and maintaining a network-layer connection to the cellular network.

13. The method of claim 11, wherein the first and second transceivers support the first communications through the cellular network using carrier aggregation in the first mode.

14. The method of claim 11, further comprising:
    configuring the second transceiver to support third communications through the cellular network to the circuit-switched network in a third mode.

15. The method of claim 11, further comprising:
    configuring a channel estimator to generate a signal for transmission to the cellular network to enable the second transceiver to switch from the first mode to the second mode.

16. The method of claim 15, wherein the signal comprises one of a channel quality indicator or a rank indicator.

17. The method of claim 15, further comprising:
    computing a channel quality indicator from a reference signal transmitted from the cellular network;
    providing the computed channel quality indicator to the cellular network; and
    overriding the computed channel quality indicator provided to the cellular network to switch the second transceiver between the first mode and the second mode.

18. The method of claim 11, further comprising:
sending, to the access point, a signal to switch from the second mode to the first mode, wherein the signal is configured to provide an indication to the access point that the second transceiver is operating in a power-saving mode.

19. The method of claim 11, further comprising:
switching the second transceiver from the first mode to the second mode in response to a threshold level of bandwidth congestion during first communications through the cellular network in the first mode.

20. The method of claim 11, wherein only one of the transmitter portion or the receiver portion of the second transceiver are configured based on the first mode and the second mode.

21. An apparatus for wireless communications at a user equipment (UE), comprising:
a controller;
a transceiver, configurable by the controller, for supporting first communications through a cellular network to at least one of a packet-based network and a circuit-switched network; and
second transceiver means, configurable by the controller, for:
supporting first communications through the cellular network in a first mode; and
supporting second communications through an access point to the packet-based network in a second mode.

22. The apparatus of claim 21, wherein the controller is configured to switch the means from the first mode to the second mode by moving a wireless connection from the cellular network to the access point while maintaining a network-layer connection to the cellular network.

23. The apparatus of claim 21, wherein the means is configurable by the controller to:
support the first communications through the cellular network using carrier aggregation in the first mode.

24. The apparatus of claim 21, wherein the means is further configurable by the controller to:
support third communications through the cellular network to the circuit-switched network in a third mode.

25. The apparatus of claim 21, wherein the controller is further configured to:
configure a channel estimator to generate a signal for transmission to the cellular network to enable the means to switch from the first mode to the second mode.

26. The apparatus of claim 21, wherein the second transceiver means are further configured to:
compute a channel quality indicator from a reference signal transmitted from the cellular network, and
provide a second channel quality indicator that is different than the computed channel quality indicator to the cellular network when switching the second transceiver between the first mode and the second mode.

27. The apparatus of claim 21, wherein the controller is further configured to generate a signal for transmission to the access point when switching the second transceiver from the second mode to the first mode, wherein the signal is configured to provide an indication to the access point that the second transceiver is operating in a power-saving mode.

28. A non-transitory computer-readable medium storing computer-executable code for wireless communication at a user equipment (UE), comprising:
code for configuring a first transceiver to support first communications through a cellular network to at least one of a packet-based network and a circuit-switched network; and
code for configuring a second transceiver to support first communications through the cellular network in a first mode with the first transceiver, second communications through an access point to the packet-based network in a second mode.

29. The computer-readable medium of claim 28, further comprising:
code for switching from the first mode to the second mode by moving its wireless connection from the cellular network to the access point, and maintaining a network-layer connection to the cellular network.

30. The computer-readable medium of claim 28, wherein the code provides for the first and second transceivers to support the first communications through the cellular network using carrier aggregation in the first mode.

31. The computer-readable medium of claim 28, further comprising:
code for configuring the second transceiver to support third communications through the cellular network to the circuit-switched network in a third mode.

32. The computer-readable medium of claim 28, further comprising:
code for configuring a channel estimator to generate a signal for transmission to the cellular network to switch the second transceiver from the first mode to the second mode.

33. The computer-readable medium of claim 28, further comprising code for:
computing a channel quality indicator from a reference signal transmitted from the cellular network, and
providing a second channel quality indicator that is different than the computed channel quality indicator to the cellular network when switching the second transceiver between the first mode and the second mode.

34. The computer-readable medium of claim 28, further comprising code for generating a signal for transmission to the access point when switching the second transceiver from the second mode to the first mode, wherein the signal is configured to provide an indication to the access point that the second transceiver is operating in a power-saving mode.

* * * * *